B. D. MORTON.
Draft-Equalizers.
No. 147,151. Patented Feb. 3, 1874.
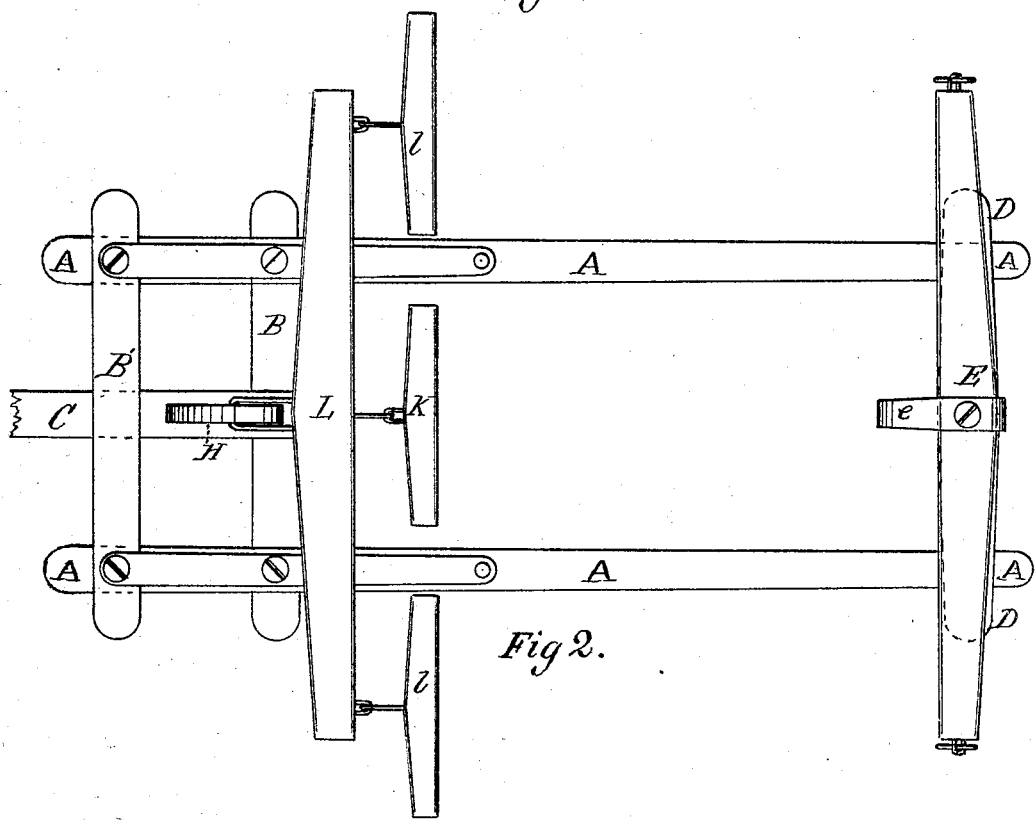
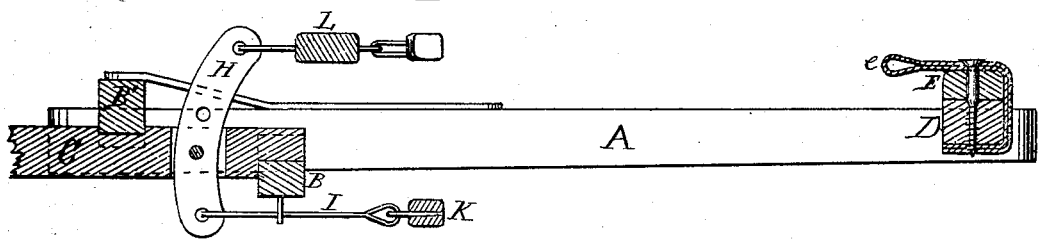

UNITED STATES PATENT OFFICE.

BENJAMIN D. MORTON, OF GREEN TOP, MISSOURI.

IMPROVEMENT IN DRAFT-EQUALIZERS.

Specification forming part of Letters Patent No. 147,151, dated February 3, 1874; application filed June 20, 1873.

*To all whom it may concern:*

Be it known that I, BENJAMIN D. MORTON, of Green Top, in the county of Schuyler and State of Missouri, have invented a new and useful Improvement in Three-Horse Equalizer, of which the following is a specification, reference being had to the accompanying drawings.

My invention relates to three-horse equalizers or eveners; and consists in providing a pair of shafts connected at their extremities so as to fulfill the offices of a pole, above the central rear portion of which is a double-tree, the ends of which extend outward beyond the edge of the frame, and below which is an arm connected with a single-tree, placed so that the horse attached to it would be within the shafts. The single-tree and double-tree are connected by a vertical lever pivoted so that the draft of the single horse is equalized to that of the pair attached to the double-tree. The object is to provide a convenient means of equalizing the draft when three horses are used.

Figure 1 is a plan view of a device embodying the elements of the invention. Fig. 2 is a vertical central section of the same.

A A are the shafts, which are constructed of the requisite strength, connected at their rear by the tie B', within which is mortised the beam C, that connects the device with the vehicle. The forward extremities of the shafts are connected by the tie D, to the upper side of which is pivoted the yoke E, a strap, e, being provided for the horse within the shafts. In a vertical slot in the beam C is pivoted the vertical lever H, the power end extending downward, to which is attached the arm or link I, that passes through an ear upon the tie B, and is secured to the swivel of the single-tree K. To the upper end of the lever H is attached the swivel of the double-tree L, the ends of which extend outward, and are provided with single-trees $l\ l$, in such positions that the horses attached will stand upon either side of the shafts, in line with the horse within the shafts.

The lever H is so pivoted that power applied at its end adjacent to the single-tree will be double the same power applied at its end adjacent to the double-tree, thus equalizing the draft when three horses are attached, as hereinbefore set forth.

The beam or connecting-piece C may be so constructed and arranged that it may be moved, and secured to the right or left of the position in which it is shown, so as to prevent the horse that is next to the grain from injuring it when the device is applied to a reaper; and the double-tree L and lever H may also be constructed so as to permit of their being adjusted according to the strength of the horses attached.

I am aware that three-horse equalizers have been applied to poles having a center draft, and do not, therefore, claim such device; but What I do claim as my invention, and desire to secure by Letters Patent, is—

The shafts A, single-tree K, link I, lever H, and double-tree L, having a center draft, substantially as shown and described.

In testimony that I claim the foregoing improvement in three-horse equalizer, as above described, I have hereunto set my hand and seal this 12th day of June, 1873.

BENJAMIN D. MORTON. [L. S.]

Witnesses:
   JACOB WITHNER,
   GEORGE FOLAND.